United States Patent Office 2,991,260
Patented July 4, 1961

2,991,260
TEXTILE PIGMENT PRINTING COMPOSITIONS
Laszlo Auer, New Rochelle, and Leslie L. Balassa, Scarborough, N.Y., assignors to J. R. Geigy A.-G., Basel, Switzerland, a Swiss firm
No Drawing. Filed Aug. 13, 1959, Ser. No. 833,368
19 Claims. (Cl. 260—22)

This invention relates to textile decorating compositions which are oil-in-water emulsions. The invention produces decorated textiles with improved resistance to wet abrasion, such as encountered in severe hand laundering or when using a washboard or other appliances that cause severe abrasion during laundering. The invention further produces improved resistance to light and provides maintenance of abrasive laundering resistance after the decorated textiles have been exposed to light.

The present application is a continuation-in-part of copending U.S. patent application Ser. No. 486,035, filed February 3, 1955 (now U.S. Patent No. 2,900,354). In such copending application, textile decorating compositions have been described, which when freshly prepared, printed and tested, yield greatly improved resistance to abrasive laundering. However, if the decorated textile is first exposed to light, the resistance to abrasive laundering is greatly reduced and frequently it may even fully disappear.

Exposure to light may be carried out in a continuous manner with the fadeometer, followed by abrasive laundering; or alternate light exposure followed by laundering may be applied and the process repeated. If the test is carried out by alternate light exposure followed by abrasive laundering, the test method is called cyclic aging test and the resistance to cyclic aging is measured. Thus the invention also aims at improved cyclic aging resistance.

The U.S. patent No. 2,900,354 described how to obtain abrasive laundering resistance by a combination of a thermosettable resinous ester of a long chain unsaturated fatty acid (I), an elastomer (II) and an organic solvent soluble thermosetting amino-aldehyde resin (III). In said patent application these three components are well defined. In order to produce abrasive laundering resistance, the 3 components should be present in distinct proportion limits and a minimum concentration of binder non-volatile content based on textile decorating composition or based on pigment content, has to be present.

As illustrated by the examples of U.S. patent No. 2,900,354 most effective elastomer combination is a copolymer of butadiene and acrylonitrile. The examples illustrate the use of such an elastomer alone or in admixture with polyvinyl chloride. According to this invention improved light resistance and excellent resistance to abrasive laundering is obtained if the elastomer component comprises an "acrylic homopolymer or copolymer" as described further below. The elastomer component of the binder according to this invention is free of butadiene polymers and copolymers.

Experience has frequently shown another drawback of prior art compositions of the abrasive laundering resistant type. If the print paste was freshly prepared from freshly made binder emulsion and the print tested before light exposure, the resulting resistance properties of the prints to abrasive laundering were satisfactory. However, if the binder emulsion was standing for several months in storage, freshly prepared print paste made from such aged binder emulsions showed frequently loss of resistance to abrasive laundering, even if tested before exposing the prints to light. Such loss of resistance to abrasive laundering is measured against the performance of the same binder emulsion freshly prepared and used without storage. According to this invention great improvement in binder storage stability is obtained by first applying the elastomers herein described and second by making the emulsions free of ammonia, and/or making them stable at pH levels below 7.

Surprisingly it has now been found that the presence of ammonia causes a pH drift ending on the acid side of the pH range. The binder emulsions, if not properly formulated may coagulate at the acid pH range; but even if they appear to be healthy and fluid, after storage aging, the prints obtained may show decreased resistance to abrasive laundering. Therefore the binder emulsions of this invention are preferably formulated to be free of ammonia and to remain stable at pH ranges below 7.

The foregoing problems of textile printing and decorating have been solved by the invention in one embodiment of which an oil-in-water emulsion is employed, said emulsion having the consistency of a textile printing paste which, when admixed with dispersed pigment produces textile prints with improved resistance to abrasive laundering, in which emulsion the total non-volatile resin binder content of the oil-phase ranges from about 3.5 weight percent to about 14.5 weight percent based upon the total weight of the emulsion, said emulsion comprising as sole non-volatile resin binder components (i) a thermosettable resinous ester of a polyhydric alcohol, which is at least trihydric, formed with a long chain unsaturated fatty acid, which resinous ester is a member of the group consisting of an ester of the reaction product of p,p'-dihydroxydiphenyldimethylmethane and epichlorhydrin, an oil-modified alkyd and a styrenated oil, (ii) an elastomer, and (iii) an organic solvent soluble thermosetting amino-aldehyde resin selected from the group of melamine-formaldehyde and urea-formaldehyde resins, said amino-aldehyde resin being present in the percentage range of from about 18 weight percent to about 35 weight percent, the resinous ester ranging from about 17 weight percent to about 37 weight percent, and the elastomer content ranging from about 37 weight percent to about 57 weight percent based upon the total weight of said non-volatile resin binder components, and said elastomer being an acrylic polymer comprising a polymerized ester of an α,β-vinylidene monocarboxylic acid formed with an alcohol which is a member of the class consisting of alkyl alcohols, substituted alkyl alcohols, alicyclic alcohols, aromatic alcohols, aralipathic alcohols, and heterocyclic alcohols, said monocarboxylic acid being a member of the class represented by the general formula

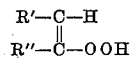

wherein R' is a member of the group consisting of hydrogen, methyl, phenyl and chlorine; and R" is a member of the group consisting of hydrogen, methyl, phenyl, ethyl and chlorine.

In specific embodiments of the invention the polymerized ester of theelastomer is an ester of acrylic or of a methacrylic acid. The acrylic acid may be a chlorine substituted acrylic acid. In another specific embodiment of the invention the polymerized ester of the elastomer is an ester of an aliphatic alcohol having from 1 to 8 carbon atoms in the molecule.

In still another specific embodiment of the invention the acrylic polymer is a copolymer comprising as additional monomer constituent at least one member of the class consisting of acrylic acid, methacrylic acid, chloracrylic acid, acrylonitrile, methacrylonitrile, acrylamide and methacrylamide; vinyl chloride, vinylidene chloride, vinyl acetate, vinyl propionate, as-dichlorethylene, dichlorethane, styrene, vinylbutyl ether, vinylisobutyl ether and vinyl-beta-chlorethyl ether.

In further specific embodiments the elastomer consists of a mixture of at least one acrylic polymer and a polymer comprising vinyl chloride or vinylidene chloride.

The oil-in-water emulsion of the invention is preferably free from ammonia and amonium ions.

In another specific embodiment of the invention the organic solvent soluble thermo-setting amino-aldehyde resin comprises additionally a member of the class of organic solvent soluble phenol-formaldehyde resins and ketone-formaldehyde resins.

In another specific embodiment the invention comprises as additional resin binder component ethylcellulose in proportions of about 1 to about 10 percent based on the combined non-volatile weight of thermosettable resinous ester (i) and organic solvent-soluble amino-aldehyde resin (iii).

In a further embodiment of the invention, the print paste formed from the oil-in-water emulsion of the invention contains a minor quantity of water soluble amino-aldehyde resin in the proportion of from about 0.2 weight parts to about 1 weight part of non-volatile water soluble amino-aldehyde resin for each weight part of pigment present in the print paste. Said water soluble amino-aldehyde resin may be a water soluble polymer of a member of the class consisting of trimethylol melamine and a hexamethylol melamine and their methyl and ethyl ethers.

The invention also comprises the process for producing decorated textiles with improved resistance to abrasive laundering wherein in the first step a pigment dispersion which contains dispersed pigment is mixed with a clear resin binder emulsion and a clear extender emulsion to produce a print paste, said paste comprising in the dispersed oil-phase as sole non-volatile resin binder components (i) a thermosettable resinous ester, (ii) an elastomer and (iii) an organic solvent soluble thermosetting amino-aldehyde resin, all said components defined as hereinbefore set forth, wherein in the second step a print is deposited on a textile fabric, the printed fabric is dried and after-treated at elevated temperatures by suitable equipment to thermoset and decoration of said fabric. Thus the binder emulsions of this invention contain as component (i) a thermosettable resinous ester of a long chain unsaturated fatty acid, as component (ii) an elastomer which comprises acrylic polymers and copolymers and as component (iii) an organic solvent-soluble amino-aldehyde resin, which is thermosetting.

*Component (i): Thermosettable resinous ester of a long chain unsaturated fatty acid.*—Typical of the oils, the fatty acids of which may form the esters used in this process are as follows: Tung oil, oiticica oil, dehydrated castor oil, linseed oil, perilla oil, sunflower oil, poppyseed oil, soya bean oil, walnut oil, rapeseed oil, pineseed oil, olive oil, corn oil, cottonseed oil, coconut oil, babassu oil, hydroxylated oils such as castor oil, etc., and fish oils (train oils).

The following polyhydric alcohols are suitable for producing esters with the above fatty acids: Glycerin, pentaerythritol, mannitol, sorbitol, alcohols formed by the condensation of bis-phenol epichlorhydrin, certain polyglycols, amongst others.

To form fatty acid modified alkyd resins, the following polycarboxylic acids and their anyhdrides may be used: Phthalic acid, maleic acid, succinic acid, malic acid, tartaric acid, fumaric acid, citric acid, adipic acid, sebacic acid, azelaic acid, suberic acid, etc., or anhydrides of such acids, also carbic anhydride. (Bicyclo 2-2-1 cycloheptane delta 5 dicarboxylic anhydride 2,3.)

Very excellent results can be obtained by styrenated alkyds which are copolymers of fatty acid modified alkyd resins and polystyrene. Styrenated fatty oils, such as styrenated linseed and soyabean oil, or styrenated dehydrated castor oil yield also interesting products.

Very satisfactory results have been obtained with pentaerythritol esters of fatty acids. These may be advantageously precondensed with maleic anhydride. Particularly advantageous results were obtained with the condensation products of bis-phenol and epichlorhydrin, esterified with fatty acids, such as dehydrated castor oil fatty acids or mixtures of the fatty acids of soyabean oil and oiticica oil. Such esters may be further modified by styrenating them.

A few examples are given of commercially manufactured resins useful in the instant process:

(1) Epichlorhydrin and bis-phenol condensation product (alcohol): Epon 1004. Dehydrated castor oil fatty acid ester of Epon 1004: Epitex 120. Epon 1004 is a condensation product of epichlorhydrin with p'-p-dihydroxy diphenyldimethylmethane as described in the Paint, Oil and Chemical Review, November 9, 1950, issue, starting on page 15 under the title of Epon Resins, New Film Formers. (See also U.S. Patent No. 2,681,322, column 10 line 44 on, and column 15, lines 37–44.)

(2) Styrenated alkyd: Styresol 4250.

(3) Phthalic anhydride-free styrenated alkyd: Soya fatty acid ester of carbic anhydride (bicyclo 2-2-1 cycloheptane delta 5 dicarboxylic anhydride 2,3) and glycerine (co-ester of fatty acids and anhydride), styrenated, Bakelite BJS 502, BJS 153 and BJS 155 resins. Polystyrene content 25 to 75%.

(4) Pentaerythritol-glycerin mixed esters of maleic anhydride treated fatty acids: Esskol, linseed oil base.

(5) Styrenated soyabean oil: Keltrol 60.

(6) Pentaerythritol alkyd resins. Constants of 5 such alkyds are given hereafter:

| | Resin A | Resin B | Resin C | Resin D | Resin E |
|---|---|---|---|---|---|
| Non-Volatile Content | 50% | 65% | 50% | 70% | 50%. |
| Solvent | Min. Sp | Min. Sp | Min. Sp | Min. Sp | Min. Sp. |
| Oil Content—percent oil on non-volatile (calculated) | 58% | 62% | 58% | 63% | 56%. |
| Phthalic Anhydride (A.S.T.M.) Des 563-45T) | 30% | 25% | 27½% | 25½% | 30.8%. |
| Type of Oil | Soya | Segregated Soya | Soya | Soya | Soya. |
| Polyhydric Alcohol | | | Pentaerythritol—Technical 100% | | |
| Acid No | 3–7 | 8 | 8–13 | 6–10 | 4–7. |
| Viscosity—Gardner-Holdt | W—Y | $Z_1$—$Z_3$ | U—X | Y—$Z_1$ | T—V. |

Min. Sp. in the above table, under Solvent, is mineral spirits. Some of the organic solvent-soluble melamine or urea resins are not miscible with mineral spirits; therefore, if such types of amino-aldehyde resins are used, the alkyd resins should be diluted with aromatic hydrocarbons, such as for instance, xylol. Such change in the solvent normally lowers the viscosity of the resin solution but otherwise does not change in film characteristics.

Commercial examples of resins in the above list are: Beckosol P–471 (Reichhold Chemicals Corporation), Syntex 62 (Jones-Dabney Company), Aroplaz 1086M and Aroplaz 1241M (U.S. Industrial Chemicals, Inc.) and P6118 (Dock Resin Corporation).

Whereas, with this invention, resins with a minimum of 50% oil content are preferred, here below are listed chemical constants of two commercial pentaerythritol alkyd resins which are shorter in oil length, and may in some cases, yield satisfactory results:

|  | Resin F | Resin G |
| --- | --- | --- |
| Non-Volatile Content | 50% | 62% |
| Solvent | Xylol | Xylol |
| Oil content—percent oil on non-volatile (calculated) | 35% | 42% |
| Phthalic Anhydride (A.S.T.M. Des 563-45T) | 40.6% | 38% |
| Type of Oil | Linseed | Soya |
| Polyhydric Alcohol |  | Pentaerythritol—Technical 100% |
| Acid No | 15-25 | 4-6 |
| Viscosity—Gardner-Holdt | X-Z | $Z_2-Z_4$ |

The polyhydric alcohols, forming the esters useful as starting materials in this process should be preferably at least tri-hydric, such as glycerin.

In this process best results are obtained with polyhydric alcohol esters of acids of fatty oils, which esters contain in their acid component at least 50% acids of fatty acids having at least two double bonds. In this definition of fatty acid esters, there is included the group of drying and semi-drying fatty oils, further the group of synthetic oils and the group of alkyd resins, not containing more than 50% polybasic acids in their acid component.

Any appropriate mixtures or combinations of members of the above described classes may be used as desired.

The better drying a fatty oil is, the more suitable it is for the present process. Further: at least some of the fatty acids present in the esters should preferably contain more than one double bond in the molecule. This includes esters of the drying oil fatty acids and of the semi-drying fatty acids. The ester resins of this invention comprise in most cases polymers i.e. polyesters.

In view of the fact, that a styrenated alkyd is also an oil-modified alkyd, the resinous ester component of the binder emulsions of this invention can be defined as being a thermosettable resinous ester of a polyhydric alcohol, which is at least trihydric, formed with a long chain unsaturated fatty acid, which resinous ester is a member of the group consisting of an ester of the reaction product of p'-p-dihydroxydiphenyldimethylmethane and epichlorhydrin, an oil-modified alkyd and a styrenated oil.

*Component (ii): Elastomer comprising an acrylic polymer.*—The expression "acrylic polymer" is considered for the purposes of this invention as a generic term which includes acrylic copolymers, i.e. polymers made of more than one acrylic monomer. An acrylic monomer is an acrylic type acid, its derivatives and substitution products of the acid and its derivatives. The term "derivative" includes esters and nitriles.

The term "an acrylic type acid" is a polymerizable alpha-beta unsaturated monovinylidene carboxylic acid, such as acrylic acid, methacrylic acid, ethacrylic acid, alpha-chloro-acrylic acid, cinnamic acid, atropic acid, crotonic acid. Preferred are acrylic and methacrylic acids. Halogen substituted acrylic acids are also advantageous.

The elastomers of this invention, comprising an acrylic polymer, are insoluble in water.

Examples of nitrile derivatives are acrylonitrile and methacrylonitrile.

Examples of ester forming alcohols are the following:

Alkyl alcohols: Methyl, ethyl, n-propyl, iso-propyl, n-butyl iso-butyl, n-amyl, iso-amyl, hexyl, 2-ethylbutyl, heptyl alcohol; 2-methyl pentanol; 3-methylethyl, n-octyl, 2-ethyl hexyl, nonyl, decyl, dodecyl, tridecyl, tetradecyl, hexadecyl, octadecyl, 3,5,5-trimethylhexyl, tertiary butyl, tertiary amyl, octadecenyl alcohol.

Substituted alkyl alcohols: Chloroethyl, chlorobutyl, 2-methoxy ethyl, 2-ethoxy ethyl, 2-propoxy ethyl, 2-butoxy ethyl, methoxy-methoxy-ethyl, 2-nitro-2-methyl propyl, dimethyl-aminoethyl, oxoalcohol of an isobutylene dimer or trimer, oxoalcohol of a propylene dimer, alkoxyethyl.

Alicyclic alcohols: Cyclohexanol, methyl-cyclohexanol.

Aromatic alcohols: Phenol and its nuclear substitution products, halogenated phenols, cresols and naphthols.

Araliphatic alcohols: Benzyl alcohol.

Heterocyclic alcohols: Furfuryl and tetrahydrofurfuryl alcohol.

Preferred are alcohols having 1 to 18 C atoms in their aliphatic chain. Most commonly useful ones have not more than 8 C atoms.

As the acrylic polymers useful herein are insoluble in water, polymers which contain the acrylic type acids as sole monomers, are excluded. The latter are soluble in water as such or in form of their ammonium or sodium salts.

Acrylic esters as monomers, polymerized alone or in admixture with each other, yield satisfactory polymers. Such polymers, however, cannot be isolubilized with ease by crosslinking and show inferior dry cleaning resistance of the decorated fabrics. Therefore, when the dry cleaning resistance of the decorated fabrics is important, this type is not preferred.

Acrylic nitriles as sole monomers yield too tough and hard polymers. They can be used, but are not preferred.

Binary copolymers of acrylic acids with acrylic nitriles and binary copolymers of acrylic acids with acrylic esters can be crosslinked and insolubilized to yield proper dry cleaning resistance. Intermixtures of these two types are very useful.

Acrylic nitrile and acrylic ester copolymers yield also improved dry cleaning resistance. They can be used alone or in admixture with acrylic acidacrylic ester copolymers.

One of the most preferred copolymers is at least ternary and contains acrylic esters, nitriles and acids copolymerized. The nitrile supplied toughness and dry cleaning resistance; the ester supplied good film forming characteristics and the acid the crosslinking properties.

Other polymerizable monomers can be copolymerized with the acrylic monomers. Examples are styrene, vinyl acetate, vinyl chloride, vinylidene chloride, amongst others.

In copolymers containing an acrylic type acid per se as a monomer, its quantity is usually between 2% and 15% of total monomer weight and in most cases it does not exceed 5%. Acrylic nitrile is copolymerized in proportions not to exceed 80% of a total monomer weight, but in most cases the proportion does not exceed 40%. Based on the total acrylic type polymer elastomer weight 15 to 30% is a very satisfactory nitrile content range. This may be derived from straight ternary copolymerization or intermixing binary copolymer latices.

Acrylic ester monomer content in copolymers may go as high as 95% to 98% of the elastomer, where acrylic nitriles are absent. Where the latter are present, the acrylic ester monomer content, based on elastomer total weight, may range from 40 to 80%.

Also this can be derived from straight ternary or binary copolymerization or by intermixing polymeric latices.

Commercially available products falling under the acrylic latex definition are exemplified by the following products:

Rhoplex AC-33, Rohm and Haas
Rhoplex AC-55, Rohm and Haas
Rhoplex B-15, Rohm and Haas
Rhoplex DS-874, Rohm and Haas
Rhoplex MR, Rohm and Haas
Rhoplex FRN, Rohm and Haas Rhoplex HA-773, Rohm and Haas
Rhoplex HA-774, Rohm and Haas
Rhoplex HA-494, Rohm and Haas
Hycar 2600x30, Goodrich
Hycar 2600x39, Goodrich
Hycar 1800x69, Goodrich
Hycar 1800x63, Goodrich
Hycar 1800x50, Goodrich
Hycar 2601, Goodrich
Dow Latex 2647, Dow Chemical These commercial products represent the following types of polymers or copolymers:

Pure acrylic esters,
Copolymers of acrylonitrile, butyl acrylate and methacrylic acid, acrylonitrile acrylic ester copolymers,
Copolymers of ethyl acrylate with methacrylic acid,
Copolymers of ethyl acrylate with vinyl acetate and acrylic acid,
Copolymers of ethyl acrylate with acrylonitrile and methacrylic acid,
Copolymers of ethyl acrylate with styrene and methacrylic acid
Copolymers of butyl acrylate with acrylonitrile and acrylic acid According to this invention a further improvement is achieved, if the acrylic type latices are intermixed with polyvinyl chloride or polyvinylidene chloride containing latices. The incorporation of the latter improves in many cases dry cleaning resistance of the textile decorations and also enhances resistance to abrasive laundering, without impairing cyclic aging resistance. In intermixes useful proportions are, based on latex non-volatile content:

20–50% polyvinyl or polyvinylidene chloride type latex and 80–50% acrylic type latex Polyvinyl chloride and polyvinylidene chloride type latices are exemplified by the following commercial products:

Geon 351, Goodrich
Geon 450x167, Goodrich
Geon 576, Goodrich
Geon 652, Goodrich
Pliolite 300, Goodyear
Dow Latex 700, Dow Chemical
Dow Latex 744-B, Dow Chemical These commercial products represent the following types of polymers and copolymers:

Pure polyvinyl chloride latices,
Pure polyvinylidene chloride latices,
Copolymers of vinyl chloride and vinylidene chloride,
Plasticized polymers, like 100 parts polyvinyl chloride plasticized with 35 parts dioctyl phthalate,
By copolymerization internally plasticized copolymers, like vinyl chloride, vinylidene chloride and methylhexyl acrylate copolymers and vinyl chloride methyl acrylate copolymers In the plasticized polyvinyl and polyvinylidene chloride polymers or copolymers the plasticizing component is usually 20–30%, based on supplied latex solids, whether the plasticizing component is internally copolymerized or externally incorporated.

*Component (iii): Organic solvent soluble thermosetting aminoaldehyde resins.*—The organic solvent-soluble amino-aldehyde resins are, for instance, alcohol modified condensation products of urea or melamine, or alkylated or etherified urea or melamine condensation products with an aldehyde, such as formaldehyde. Other amino-aldehyde resins which are known in the art which are solvent-soluble may also be incorporated. The term "organic solvent-soluble amino-aldehyde resins," as used in this application, refers to resins of that type which are water immiscible.

Commercial examples of organic solvent-soluble amino-aldehyde resins are as follows:

| Manufacturer | Trade Name | Solids | Solvent |
| --- | --- | --- | --- |
| Rohm and Haas Co. (Resinous Products Division). | Uformite F158 | 50 | Xylol-Propanol (3:7). |
| | Uformite F200E | 50 | Xylol-Butanol (1:1). |
| | Uformite F210 | 50 | Do. |
| | Uformite F266E | 50 | Capryl-Alcohol-Butanol. |
| | Uformite F223 | 50 | Xylol-Butanol (1:2½). |
| | Uformite F240 | 60 | Do. |
| | Uformite F240N | 60 | High Flash Naphtha. |
| | Uformite MM-46 | 60 | Xylol-Butanol (1:1). |
| | Uformite MM-55 | 50 | Xylol-Butanol (1:4). |
| | Uformite MM-55HV | 50 | Xylol-Butanol (1:9). |
| | Uformite MU-56 | 50 | Xylol-Butanol (1:3). |
| | Uformite MX-61 | 60 | Xylol-Butanol (1:1). |
| | Uformite M-311 | 50 | Xylol. |
| (Reichhold Chemicals Inc.) | Beckamine 3520 | 50 | Xylol-Butanol. |
| | Beckamine P-138 | 60 | Do. |
| | Beckamine P-196 | 60 | Butanol-Ethanol. |
| | Beckamine P-354 | 50 | Xylol-Butanol. |
| (American Cyanamid Co.) | Beetle 212-9 | 60 | Butanol-Octyl Alcohol-Petroleum Aromatic. |
| | Beetle 216-8 | 60 | Xylol-Butanol. |
| | Beetle 219-8 | 50 | Do. |
| | Beetle 220-8 | 50 | Do. |
| | Beetle 227-8 | 50 | Do. |
| | Beetle 230-8 | 50 | Do. |
| | Cymel 243-3 | 60 | Do. |
| | Cymel 245-8 | 50 | Do. |
| | Cymel 247-10 | 60 | Butanol. |
| | Cymel 248-8 | 55 | Xylol-Butanol. |
| (Monsanto Chemicals Co.) | Resimene 875 | 50 | Butanol-Xylol. |
| | Resimene 876 | 50 | Do. |
| | Resimene 877 | 50 | Butanol-Mineral Spirits. |
| | Resimene 878 | 50 | Butanol-Butyl Cellosolve. |
| | Resimene 881 | 60 | Butanol-Xylol. |
| | Resimene 882 | 65 | Xylol. |
| | Resimene 883 | 60 | Butyl Cellosolve-Mineral Spirits. |
| | Resimene U-901 | 50 | Butanol-Xylol. |
| | Resimene U-920 | 60 | Do. |
| (Plaskon-Barrett Div.) (Allied Chemical and Dye Corp.). | Plaskon 3382 | 55 | Xylol-Butanol. |

The Uformites which have MM in their number, the Cymels, and the Resimene 800 Series are organic solvent-soluble melamine-aldehyde resins. The alcohols used to obtain this class of resins are exemplified by butyl alcohol, capryl alcohol, etc.

The organic solvent soluble thermosettable amino-aldehyde resins fall into the following categories: melamine-formaldehyde resins, urea-formaldehyde resins, urea-melamine-formaldehyde resins, cyclicized urea-formaldehyde resins. These resins can also be made from substituted urea and substituted melamine.

Phenol-formaldehyde resins and ketone-formaldehyde resins can replace in some cases up ot 50% of the amino-aldehyde resins of this class. (Percents are based on amino-aldehyde resin non-volatile content.)

As optional fourth component ethyl cellulose can be added to the binder solids. Suitable proportions are e.g. 1% to 10% ethylcellulose based on combined resin solid of Component (i) and Component (iii).

The binders of this invention are used to bond pigments to the textile materials.

The pigment components useful in this invention can be classified into organic pigments and inorganic pigments. Carbon black is herein considered as an organic pigment.

ORGANIC PIGMENTS

The organic pigments used herein are usually prepared by precipitation methods. They are all water insoluble. As starting material for this invention either a filter press cake or dry powder can be used. Carbon black, if used, is not made by precipitation method and is used as dry powder in the process.

The following groups of pigments are illustrative, but do not limit the scope of the starting materials of this invention:

(1) Phthalocyanine pigments

Phthalocyanine blue, which is a copper or tin-copper phthalocyanine is marketed under trade names of Monastral Fast Blue and as a Heliogen Blue. Phthalocyanine green, which is a chlorinated copper phthalocyanine color, is marketed under trade names of Monastral Fast Green and as Heliogen Green.

(2) Insoluble azo pigments

Benzidine yellows are couplings between dichlorobenzidine and acetoacetic arylides, such as the acetoacetic-anilide, -ortho toluidide, -xylidide, -para chloro anilide, O-anisidide and -ortho chloro anilide.

Benzidine orange is a coupling product of dichlorobenzidine with pyrazolone substitution products, such as methyl-phenyl-pyrazolone.

Hansa Yellows are acetoacetic arylide couplings with substituted anilines, like 4-chloro-2-nitroaniline, or ortho-nitraniline, amongst others.

Insoluble Azo Reds are coupling products of the Naphthol AS type compounds of beta-ortho-naphthoic acid, such as Naphthol AS, Naphthol AS–OL, Naphthol AS–BS, Naphthol AS–D with fast color salts, such as 2,5 dichloroaniline, p-nitroorthotoluidine, p-nitro-orthoanisidine, amongst others. One example being the coupling product of Naphthol AS–ITR Fast color salt (Fast Red Color Salt ITR).

Naphthol AS type couplings may yield also yellows and oranges of the insoluble azo pigment group. Aniline Black pigment can be listed here too.

Toluidine maroon and Dianisidine Blue and a brown pigment obtained by forming the copper salt of paranitraniline red are other examples.

(3) Vat pigments

Vat pigments are of the indigoid or anthraquinone type. The indigoid type includes thioindigo derivatives and the anthraquinone type includes derivatives of flavanthrene, benzathrone and complex structures made by condensing benzanthrone molecules.

Thioindigo Red B has Color Index No. 1207 and Schultz No. 912. For structural formulae see pages 204 to 214 in Pratt: Chemistry and Physics of Organic Pigments, John Wiley and Sons, 1947.

Indanthrene Blue Color Index No. 1106, Schultz No. 837 is an example of the anthraquinone type vat pigments.

Structural formulae of some vat pigments are listed on pages 429 to 435 in volume V of Mattiello: Protective and Decorative Coatings, John Wiley and Sons, Inc., New York, 1946. They include Indanthrene Rubine RD, Indanthrene Orange RRTA, Indanthrene Golden Orange GA, Indanthrene Brown RA, Helio Fast Yellow 6GL, Indanthrene Brilliant Violet 3BA, Fast Violet 4RN, Indigo Blue, Indanthrene Navy Blue, RA.

(4) Carbon blacks

Furnace Blacks, Channel Blacks, acetylene gas blacks and lampblacks can also be used in the instant proces.

INORGANIC PIGMENTS

Examples of inorganic pigments useful as starting materials of this invention are amongst others:

Titanium dioxide
Precipitated iron oxide pigments (for instance, yellow and brown iron oxides)
Cadmium sulfide and selenide pigments such as cadmium yellows, oranges, and reds In the pigment dispersion step of this invention the following dispersing agents are preferred:

Fatty alcohol sulfates, such as sodium, ammonium, morpholine or triethanolamine salts of sulfates of lauryl alcohol, cetyl alcohol, oleyl alcohol and/or their mixtures. Sulfates of hydroabietyl alcohol act similarly to fatty alcohol sulfates.

Examples of commercial products are Duponol ME, which is a dry powder form of sodium lauryl sulfate, manufactured by E. I. du Pont de Nemours and Co., and Duponol WA paste, which is a water paste of the same compound, containing 30% active ingredient and some inorganic salt impurities.

It was found that the action of fatty alcohol sulfates is greatly enhanced and improved by using as further additive a minor quantity of sodium alkyl naphthalene sulfonates, such as the isopropyl naphthalene sulfonate and the isobutyl naphthalene sulfonate. The former is marketed under the trade name of Nekal A by the General Dyestuff Corporation and the latter as Nekal DK by the same company.

Further improvement in degree of deflocculation of the pigment is obtained, by adding protective colloids to the water dispersion, such as casein and methylcellulose.

The proportion of surface active agent to pigment content is very important. The fatty alcohol sulfates may be added, for instance, in proportions of 2 to 20% per 100 parts of dry pigment, but for complete deflocculation of the pigment at least 10% and preferably 15 to 20% are used. Higher proportions of fatty alcohol sulfate are permissible, but do not seem to produce further improvement, in deflocculation, to a degree to warrant such increase. Larger proportions may be used, however, to satisfy specialty purposes of incorporation into finished products or to satisfy machinery limitations.

The sodium alkyl sulfonates are added in proportions of ½% to 4% based on the pigment content, 2% being a preferred and satisfactory proportion.

If protective colloids are added, about 1% of dry casein is used, based on the dry pigment content and about 5% methylcellulose low viscosity type, designated as 15 cps. type in the trade. Larger quantities of protective colloids can be added, but their action is distinct in the here given proportions. They help to complete deflocculation and keep the particles in suspension.

Some pigments require larger proportions than 20% surface active agent, and the required percentage may go up as high as 40%.

A further improvement of the pigment dispersion step of this invention consists in carrying out the deflocculation of the pigment at elevated temperature which ranges from above room temperature to below the boiling point of water, as for instance 90° C.

Carbon blacks are advantageously converted to water dispersions by this method for the purposes of this invention.

In the example of this specification casein, methylcellulose and sodium carboxymethylcellulose are mentioned as suitable colloids. Others which may be used are: gum tragacanth, carrageen moss, dextrin, starch solutions, sodium polyacrylates, sodium poly-methacrylates, hydroxy ethylcellulose of the water soluble and alkali soluble types, locust bean gum, water soluble salts of the maleic adduct of styrene, etc. Alginates may be used also, or albumene or soya protein. Other examples are water soluble ethyl-hydroxyethylcellulose, carboxymethyl-starch, hydroxy-propyl-starch ether, polyvinyl pyrrolidone, polyvinyl alcohol, amongst others.

As far as protective colloids and emulsifying agents go, care should be exercised that anionic and non-ionic agents and systems may be mixed, and cationic agents and systems may be mixed with non-ionic agents and systems, but cationic and anionic agents or systems normally cause flocculation of the emulsion or of the pigments. Ammonium caseinate, e.g., acts anionic, but it is possible to use casein in cationic systems, if it is dissolved with the aid of cationic quaternary ammonium compounds.

The pigment color concentrate component of this invention contains aqueous pigment dispersion. These pigment color concentrates dilute with water and may contain resin binder or may be resin-free. The pigment content of these pigment color concentrates varies.

Illustrative limits are, for example:

|  | Organic Pigments | Inorganic Pigments |
| --- | --- | --- |
| If binder resins present | from about 4.5% to about 30.0% (by weight). | from about 12.0% to about 35.0% (by weight). |
| If binder resin is absent | from about 10.0% to about 40.0% (by weight). | from about 30.0% to about 70.0% (by weight). |

It is known in the art to catalyze the thermo-setting process of water soluble amino-aldehyde resins by acids, for instance, or by salts of acids which at the curing temperature (thermo-setting temperature) will split off free acid. These acids and salts are water soluble and many of them are insoluble in organic solvent systems. From the organic solvent-soluble amino-aldehyde resins the urea formaldehyde resins were catalyzed in the art by the action of organic solvent-soluble catalysts such as various alkyl-phosphoric acids. The phenomenon of "catalytic action" as the expression is used in this application is evidenced by either a reduction of time of thermo-setting at a given temperature, or reduction of the thermo-setting temperature for a given time, required to produce the satisfactory wet-abrasion-resistant decorated surface.

The surprising discovery was made according to this invention, that the following water soluble catalysts can effect catalytically the thermo-setting process of organic solvent-soluble melamine-aldehyde resins, when the latter are present in a stable oil-in-water emulsion. Similarly organic solvent-soluble urea-aldehyde resins can also be catalyzed in the same way.

Examples of such catalysts are: tartaric acid, glycolic acid (hydroxy acetic acid), lactic acid, benzoic acid, sulfuric acid, nitric acid, formic acid, amongst others. These acids are advantageously incorporated in the form of their ammonium salts, like ammonium tartrate, ammonium glycolate, ammonium lactate, ammonium sulphate, ammonium nitrate, ammonium phosphate, and ammonium benzoate. These ammonium salts, when added to an emulsion, which has a pH higher than 7, the pH of the emulsion being adjusted by ammonia, are stable in the emulsion and after the print paste is applied and the print heated to elevated temperatures, will split off free acid in situ, thereby catalyzing the thermo-setting reaction. Instead of ammonium salts, other salts may be used which act similarly, morpholine salts being an example.

According to another improvement of this process, surface active agents may be used in the pigmented resin emulsions, which may be a pigment dispersing agent or an emulsifying agent, which is a salt of a non-fixed base, such as ammonia or morpholine, amongst others. Such surface active agent while the emulsion is stored with a pH above 7 will remain inactive and stable, and after the textile decoration has been achieved and the fabric is heated to elevated temperature: it will split off free acid, which acts as a catalyst for the thermo-setting reaction of the organic solvent-soluble amino-aldehyde resins.

Examples are: ammonium fatty alcohol sulfates, such as ammonium oleyl sulfate, ammonium cetyl sulfate, ammonium lauryl sulfate, morpholine oleyl sulfate, dioctyl ester of ammonium sulphosuccinic acid, ammonium sulphonate of an oleyl acid ester of an aliphatic compound, ammonium salts of aryl-alkyl poly-ether sulphonates, ammonium isopropyl naphthalene sulphonate, etc.

According to this invention, the surprising discovery was made that small quantities of water-soluble amino-aldehyde resins sensitize the organic solvent-soluble amino-aldehyde resins undergoing the thermo-setting process.

Examples are: Water-soluble polymers of trimethylol melamine and hexamethylol melamine, or their substitution products such as methyl or ethyl ethers thereof, amongst others. Water-soluble urea-aldehyde resins and substituted urea-aldehyde resins are also suitable. The quantity of such sensitizers is small and it is usually in the range of 5% to 20% based on the color concentrate portion of the print paste or from about 0.2 weight parts up to 1 weight part for every one weight part of dry pigment in the textile decorating composition. In the preferred range 0.6 weight parts for every one weight part of pigment approaches the maximum satisfactory proportion. The actual chemical nature of this reaction has not yet been fully investigated. Resloom M–75, Aerotex M–3 resin and Lyofix CH are commercially available examples of products useful in this phase of the invention.

Although the binder emulsions of the invention are useful in textile decorating generally and may be applied, e.g. to pad dyeing as well as to printing, the following examples are all drawn from the printing art.

These examples are given in order to illustrate the invention and should not be construed to limit the invention.

EXAMPLE 1.—SCHEMATIC FORMULA OF A LATEX-FREE RESIN EMULSION CONTAINING COMPONENT (i) AND COMPONENT (iii)

|  | Weight Parts | N.V. Content |
| --- | --- | --- |
| Oil Phase: |  |  |
| Epitex 120 (50% N.V. in xylol) | 17.84 | 8.92 |
| Resimene 882 (65% N.V. in xylol) | 17.30 | 11.25 |
| Drier Mix | 0.28 |  |
| Xylol | 5.20 |  |
| Water Phase: |  |  |
| 9% aqueous solution of methylcellulose 15 cps. grade | 43.14 | 3.88 |
| 3% aqueous solution of methylcellulose 4,000 cps. grade | 2.61 | 0.08 |
| Duponol WAQ (lauryl alcohol sulfate, sodium salt, 30% N.V.) | 4.45 | 1.34 |
| Water | 8.86 |  |
| Antifoam | 0.32 |  |
|  | 100.00 | 25.47 |

Premix the oil phase. Premix the water phase in a container and incorporate the oil phase into the water phase in increments, while agitating with enclosed turbine type high speed agitator, such as the Eppenbach homomixer or Barrington mixer.

EXAMPLE 2.—SCHEMATIC FORMULA OF A LATEX CONTAINING BINDER FROM THE LATEX-FREE RESIN EMULSION OF EXAMPLE 1

|  | Parts |
|---|---|
| Resin emulsion of Example 1 | 63.37 |
| Acrylic type latex 35% N.V. | 46.67 |
|  | 110.04 |

This formulation is written for a 35% N.V. latex, as this represents the lowest non-volatile content for commercially available acrylic type latices. Where the N.V. content of the latex is higher, water is added to reduce the N.V. to 35%.

The binder emulsion of Example 2 contains for every 110 parts of binder emulsion 5.65 parts of thermosettable resinous ester of Component (i) N.V., 7.12 parts of organic solvent soluble amino-aldehyde resin N.V. of Component (iii) and 16.33 parts of elastomer N.V. of Component (ii). In addition it also contains 3.36 parts of protective colloid and emulsifying agent N.V. The total N.V. in 110 parts of binder emulsion is 32.46 parts, which represents 29.50% N.V. based on binder emulsion weight. In 100 parts of binder non-volatile content in Example 2 there is 19.4% of Component (i) ester resin, 56.1% of Component (ii) elastomer and 24.5% of Component (iii) amino-aldehyde resin.

In this example the interrelationship of the 3 components can be varied within the limits herein claimed. The ester resin can be substituted with another ester resin herein disclosed. The same applies to the amino-aldehyde resin. The protective colloids can be varied and substituted as herein disclosed and various suitable emulsifying agents can be substituted for the one mentioned in Example 1. Emulsifying agents are selected according to the resins to be emulsified.

Providing the latex used in Example 2 is free of ammonia, the resulting binder emulsion is ammonia-free. Ammonia can be present without disturbing cyclic aging resistance of the decorated fabrics, when freshly prepared binder emulsions are used. However, after longer storage of the binder emulsions the ammonia-free products show great superiority over the ammonia containing ones as far as the cyclic aging resistance of the resulting textile decorations is concerned. It should be noted, that the resin emulsion of Example 1 is stable on the acid side of the pH range, i.e. below pH 7.

The following are examples of suitable drier mixtures:

Lead naphthenate solution, 24%; metal content 200 parts by weight,
Cobalt naphthenate solution, 6%; metal content 25 parts by weight,
Zinc naphthenate solution, 6%; metal content 30 parts by weight.

Ethylcellulose can be incorporated into the composition of Example 2, by dissolving directly in the "oil-phase" of the resin emulsion the ethylcellulose, by agitation. E.g. a 10 cps. grade ethylcellulose can be dissolved in proportions ranging from 1% to 10% based on combined resin non-volatile content of the oil-phase, i.e. the fatty acid ester resin and amine-aldehyde resin N.V. The ethylcellulose containing resin emulsion can then be intermixed with the latex component in the same manner as the resin emulsion which is free of ethylcellulose.

In Example 2 particularly good results have been obtained with the following commercial latices and latex mixtures as the elastomer component:

(a) Acrylic type latices as sole latex component:
  Hycar 2601
  Hycar 1800x69
  Rhoplex MR
  Rhoplex HA-774
  Rhoplex HA-494
  Rhoplex DS-874
  Dow Latex 2647

(b) Intermixes of acrylic type latices in proportion of 50:50, based on latex non-volatile content:
  Hycar 2601 and Rhoplex MR
  Hycar 2601 and Rhoplex FRN
  Rhoplex 774 and Rhoplex FRN (c) Intermixes of polyvinyl chloride and polyvinylidene chloride type latices with acrylic type latices (intermix proportions are based on total latex N.V.):
  50% of either one of—
    Geon 351
    Geon 450x167
    Geon 576
    Geon 652
    Pliolite 300
    Dow Latex 700
    Dow Latex 744-B
  With 50% of group (a) above or with 50% of group (b) above In these latex mixtures the proportion can be changed from the 50:50 ratio in between the ranges of a 35:65 ratio and a 65:35 ratio, to obtain specific effects.

Many of the latices show further improvement if latex stabilizers are incorporated into the product of Example 2. Examples for latex stabilizers are morpholine, triethylamine, Emulphor ON, Igepal CO-880. The last mentioned two agents are products of Antara Division, General Aniline and Film Corporation and are nonionic surface active agents. The stabilizers can be incorporated into the binder emulsion during its manufacture or they can be incorporated into the latex component prior to its incorporation into the binder emulsion. Triton X-155 of Rohm and Haas is another example for latex stabilization. It is non-ionic in character.

As polyvinyl chloride and polyvinylidene chloride containing latices the following chemical constitutions gave satisfactory results (all proportions based on non-volatile content):

(1) Copolymer of vinyl chloride 46 parts, vinylidene chloride 27 parts and methacrylic acid 27 parts,
(2) Copolymer of vinyl chloride 25 parts and vinylidene chloride 75 parts,
(3) Copolymer of vinyl chloride 80 parts with methyl acrylate 20 parts,
(4) Latex containing 100 parts of copolymer (3) and 35 parts of dioctyl phthalate in its non-volatile content,
(5) Copolymer of vinyl chloride 46 parts, vinylidene chloride 27 parts and methylhexyl acrylate 27 parts.

The elastomer containing binder of Example 2 may be varied by using the following proportions of principal ingredients:

|  | Alternative I | Alternative II | Alternative III | Alternative IV |
|---|---|---|---|---|
| Ester Resin | 22.56 | 32.20 | 28.37 | 19.77 |
| Organic solvent-soluble amino-aldehyde resin | 25.63 | 27.81 | 27.11 | 25.16 |
| Elastomer | 51.81 | 39.99 | 44.52 | 55.07 |
|  | 100.00 | 100.00 | 100.00 | 100.00 |

EXAMPLE 3.—A SUITABLE PIGMENT DISPERSION IN WATER.—PROCEDURE A

This example describes the preparation of pigment dispersion in water which illustrates a useful intermediate product in this process.

To a phthalocyanine green press cake marketed under the trade name of Heliogen Green GV presscake, having 27.6% pigment content, Duponol ME dry powder was added to yield 18% Duponol on the pigment content, and Nekal A dry powder was added to yield 2% addition on the pigment content. The press cake was mixed with a spatula by hand and after 5 minutes it became completely liquid. It has been found that dry powder addition, which is attractive as it does not increase water content, yields very satisfactory results. However, the pre-mixing presents some problem and knife pronged agitators are needed, such as pony mixer blades, to liquefy the press cake to a slurry. Propeller types, or other turbine type agitators do not work well at this stage, as they could not manage to break up the lumps of the press cake. The premix is then further dispersed by the aid of an Eppenbach homomixer, which is a high speed enclosed turbine mixer, having a narrow clearance between turbine and stator. It runs about 3,600 r.p.m. About 15 minutes is satisfactory, but occasionally up to 30 minutes may be used. A 5 H.P. motored mixer satisfactorily disperses a 500 lb. press cake quantity in a 55 to 60 gal. size drum (open head drum). The active ingredient in Duponol ME dry powder is the same as that of Duponol WA paste, i.e. technical sodium lauryl sulfate.

The homomixed slurry is passed through a colloid mill, to complete dispersion and deflocculation. Pebble milling is also very satisfactory to complete pigment deflocculation and dispersion. 24 hours to 48 hours are satisfactory milling times.

EXAMPLE 4.—A SUITABLE OIL-IN-WATER RESIN EMULSION CONTAINING COLOR CONCENTRATE USING ORGANIC PIGMENT.—PROCEDURE B

For the illustration of this process a pigmented oil-in-water color concentrate is prepared, having the following composition:

| | |
|---|---:|
| Ester resin (for instance dehydrated castor oil ester of a condensation product of bisphenol and epichlorhydrin, applied from 50% solution in xylol) _____percent N.V__ | 3.36 |
| Melamine-formaldehyde resin, organic solvent-soluble, like Cymel 245-8, applied from 50% solution in xylol-butanol mixture percent N.V__ | 0.37 |
| Protective colloids _____do____ | 1.61 |
| Surface active agents, such as fattey alcohol sulfates, alkyl-aryl-sulfonates _____percent N.V__ | 1.96 |
| Total pigment-free N.V. _____do____ | 7.30 |
| Pigment _____do____ | 10.40 |
| Total non-volatile _____do____ | 17.70 |
| Water immiscible organic solvent (from resin solutions) _____percent__ | 3.73 |
| Water _____do____ | 78.57 |
| Total _____do____ | 100.00 |

The pigment of this example is a vat violet, Color Index No. 1104. This product is prepared by first making a pigment dispersion in water by the method outlined in Example 3, Procedure A, and mixing therewith a prepared resin emulsion of the oil-in-water type. The surface active agents include the pigment dispersing agents used in preparing the water dispersion of the pigment, and the emulsifying agent used in preparing the resin emulsion. The protective colloids are partly used in the pigment dispersion component and derived in part from the pigment dispersion component and in part from the resin emulsion component. The product of this example is a pigmented oil-in-water color concentrate. In this example the resins and pigment can be varied, using other equivalent products described in this specification.

EXAMPLE 5.—A SUITABLE OIL-IN-WATER RESIN EMULSION CONTAINING COLOR CONCENTRATE USING INORGANIC PIGMENT.—PROCEDURE C

This example is similarly prepared as the product of Example 4. It contains the following ingredients:

| | |
|---|---:|
| Ester resin _____percent N.V__ | 10.63 |
| Organic solvent-soluble melamine formaldehyde resin _____percent N.V__ | 1.17 |
| Protective colloid _____do____ | 3.99 |
| Surface active agent _____do____ | 6.45 |
| Total pigment-free N.V. _____do____ | 22.24 |
| Pigment _____do____ | 28.85 |
| Total non-volatile _____do____ | 51.09 |
| Water immiscible organic solvent _____percent | 11.80 |
| Water _____do____ | 37.11 |
| Total _____do____ | 100.00 |

The pigment of this example is a cadmium yellow inorganic pigment toner. Because of the lower water absorption properties of this pigment, a color concentrate with a substantially higher pigment content can be prepared than in the case of the vat violet pigment of Example 4.

Example 4 represents a pigmented oil-in-water resin emulsion color concentrate with a comparatively lower pigmentation and Example 5 represents a similar product with a high pigmentation. With regard to pigmentation, for illustration purposes, the products of Examples 4 and 5 may be considered to illustrate the low and high extremes.

EXAMPLE 6.—BINDER-FREE SUITABLE METHYLCELLULOSE CONTAINING CLEAR EXTENDER EMULSION FOR PRINTING.—PROCEDURE D

| | Parts |
|---|---:|
| 3% aqueous solution of methylcellulose, 4000 cps. grade _____ | 10.00 |
| Lauryl alcohol sulfate, ammonium salt, 30% active _____ | 2.50 |
| Antifoam (silicone emulsion) _____ | 0.20 |
| Water _____ | 14.80 |
| Mineral spirits _____ | 58.00 |
| | 85.50 |

Procedure: Mix the first 4 ingredients in a container, start enclosed turbine type high speed agitator and incorporate the mineral spirits in increments under agitation.

EXAMPLE 7.—A SUITABLE METHYLCELLULOSE CONTAINING CLEAR EXTENDER EMULSION FOR PRINTING, MADE ACCORDING TO THIS INVENTION

| | Parts |
|---|---:|
| Binder emulsion of Example 2_____ | 14.50 |
| Binder-free clear extender emulsion of Example 6_____ | 85.50 |
| Binder containing methylcellulose type clear extender emulsion_____ | 100.00 |

EXAMPLE 8.—PRINT PASTES WITH EXTENDER EMULSION OF EXAMPLE 7

| | Parts |
|---|---:|
| Print paste A. 1:4 cut (dark shade): | |
| Pigment dispersion or color concentrate according to either one of Examples 3, 4 or 5__ | 100 |
| Binder emulsion of Example 2_____ | 100 |
| Clear extender emulsion of Example 7_____ | 300 |
| Total weight parts_____ | 500 |
| Print paste B. 1:49 cut (light medium shade): | |
| Print paste A_____ | 450 |
| Clear extender emulsion of Example 7_____ | 450 |
| Total weight parts_____ | 500 |

Print paste C. 1:99 cut (light shade):
  Print paste A _____ 50
  Clear extender emulsion of Example 7 _____ 950

Total weight parts _____ 1000

Print paste D. 1:199 cut (very light shade):
  Print paste A _____ 25
  Clear extender emulsion of Example 7 _____ 975

Total weight parts _____ 1000

EXAMPLE 9.—METHYLCELLULOSE-FREE EXTENDER CLEAR EMULSION TO PRINT DARK SHADES

Parts
Binder emulsion of Example 2 _____ 500
Ammonium lauryl sulfate, 30% active _____ 60
Mineral spirits _____ 440

Total _____ 1000

Procedure: Mix first two items, start enclosed turbine type high speed agitator and incorporate the mineral spirits in increments under continued agitation.

EXAMPLE 10.—METHYLCELLULOSE-FREE EXTENDER EMULSION TO PRINT LIGHT SHADES OR TO REDUCE COLOR STRENGTH OF DARK PRINT PASTES

Parts
Clear emulsion of Example 9 _____ 315.8
Emulphor ON, 10% aqueous solution _____ 52.6
Water _____ 105.4
Mineral spirits _____ 526.2

Total _____ 1000.0

Procedure: Mix first three items, start enclosed turbine type high speed agitator and incorporate the mineral spirits in increments under continued agitation.

EXAMPLE 11.—PRINT PASTES WITH EXTERIOR EMULSION OF EXAMPLE 9 AND EXAMPLE 10

Print paste A. 1:4 cut (dark shade):              Parts
  Pigment dispersion or color concentrate according to either one of Examples 3, 4 and 5 _____ 100
  Clear extender emulsion of Example 9 _____ 400

Total _____ 500

Print paste B. 1:49 cut (light medium shade):
  Print paste A _____ 50
  Clear extender emulsion of Example 10 _____ 450

Total _____ 500

Print paste C. 1:99 cut (light shade):
  Print paste A _____ 50
  Clear extender emulsion of Example 10 _____ 950

Total _____ 1000

Print paste D. 1:199 cut (very light shade):
  Print paste A _____ 25
  Clear extender emulsion of Example 10 _____ 975

Total _____ 1000

The print pastes of Examples 8 and 11 illustrate two different printing methods. In Example 8 a methylcellulose containing clear extender emulsion system is used. In Example 11 the clear extender emulsion system is free of methylcellulose. In differentiating between the print pastes of Example 8 and Example 11 in this manner, the methylcellulose content of the binder emulsion is disregarded.

Both procedures outlined in Examples 8 and 11 can be further modified without departing from the scope of this invention. For example the lighter shades of 1:49, 1:99 and 1:199 cuts of Example 8 could be prepared directly from the color concentrate or pigment dispersion, without preparing first the paste A-type master batch. Further: the methylcellulose and mineral spirits proportions could be varied. Still further: A single clear extender emulsion could be prepared both for dark and light shades by increasing binder emulsion content of the clear extender emulsion of Example 7 and eliminating binder emulsion addition, per se, in the darker shades. When condering the print pastes of Example 11, the same type of variations could be carried out as outlined for Example 8. The lighter shades could be prepared directly from the color concentrate and instead of using the products of Examples 9 and 10, a product could be used similar to Example 10, possibly with some increase in binder emulsion content, which could be used both for dark and light shades simultaneously.

Many other clear extender emulsion systems could be used, such as those based on sodium or ammonium alginate, gum tragacanth, etc.

In case of print pastes used on synthetic fiber containing fabrics penetrants are added advantageously to the print pastes. Terpene ethers and hexyleneglycol are examples of suitable penetrants. One percent, based on the print pastes, is a useful proportion. In some instances less or more may be used. Ranges are between 0.1% to 2%, based on the weight of the print paste.

EXAMPLE 12.—PRINT PASTES WITH ADDITION OF WATER-SOLUBLE AMINOALDEHYDE RESINS

The print pastes of Example 8 are repeated with the only change, that in paste A 10 parts of the clear extender emulsion of Example 7 are replaced by 10 parts of a water-soluble melamine-formaldehyde resin, 60% non-volatile content (e.g. Resloom M–75). This reduces the clear extender emulsion quantity to 290 parts.

Having thus disclosed the invention, what is claimed is:

1. An oil-in-water emulsion having the consistency of a textile printing paste which when admixed with dispersed pigment produces textile prints with improved resistance to abrasive laundering, in which emulsion the total non-volatile resin binder content of the oil-phase ranges from about 3.5 weight percent to about 14.5 weight percent based upon the total weight of the emulsion, said emulsion comprising as sole nonvolatile resin binder components (i) a thermo-settable resinous ester of a polyhydric alcohol, which is at least trihydric, formed with a long chain unsaturated fatty acid, which resinous ester is a member of the group consisting of an ester of the reaction product of p,p'-dihydroxydiphenyldimethylmethane and epichlorhydrin, an oil-modified alkyd and a styrenated oil, (ii) an elastomer, and (iii) an organic solvent soluble thermosetting amino-aldehyde resin selected from the group of melamine-formaldehyde and urea-formaldehye resins, said amino-aldehyde resin being present in the percentage range of from about 18 weight percent to about 35 weight percent, the resinous ester ranging from about 17 weight percent to about 37 weight percent, and the elastomer content ranging from about 37 weight percent to about 57 weight percent based upon the total weight of said non-volatile resin binder components, and said elastomer being an acrylic polymer comprising a polymerized ester of an $\alpha,\beta$-vinylidene monocarboxylic acid formed with an alcohol which is a member of the class consisting of alkyl alcohols, substituted alkyl alcohols, alicylic alcohols, aromatic alcohols, araliphatic alcohols and heterocyclic alcohols, said monocarboxylic acid being a member of the class represented by the general formula of

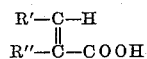

wherein R' is a member of the group consisting of H, $CH_3-$, $C_6H_5-$ and Cl and R" is a member of the group consisting of H, $CH_3-$, $C_6H_5-$, $C_2H_5-$ and Cl.

2. An oil-in-water emulsion according to claim 1, wherein the polymerized ester of the elastomer is an ester of acrylic acid.

3. An oil-in-water emulsion according to claim 1, wherein the polymerized ester of the elastomer is an ester of methacrylic acid.

4. An oil-in-water emulsion according to claim 1, wherein the polymerized ester of the elastomer is an ester of a chlorine substituted acrylic acid.

5. An oil-in-water emulsion according to claim 1, wherein the polymerized ester of the elastomer is an ester of an aliphatic alcohol having from 1 to 8 carbon atoms in the molecule.

6. An oil-in-water emulsion according to claim 1, wherein the acrylic polymer is a copolymer comprising as additional monomer constituent at least one member of the class consisting of acrylic acid, methacrylic acid, chloroacrylic acid, acrylonitrile, methacrylonitrile, acrylamide and methacrylamide.

7. An oil-in-water emulsion according to claim 1, wherein the acrylic polymer is a copolymer comprising as additional monomer constituent at least one member of the class consisting of vinyl chloride, vinylidene chloride, vinyl acetate, vinyl propionate, as-dichlorethylene, dichlorethane, styrene, vinylbutyl ether, vinylisobutyl ether and vinyl-beta-chlorethyl ether.

8. An oil-in-water emulsion according to claim 1, wherein the elastomer consists of a mixture of at least one acrylic polymer and a polymer comprising polymerized vinyl chloride.

9. An oil-in-water emulsion according to claim 1, wherein the elastomer consists of a mixture of at least one acrylic polymer and a polymer comprising polymerized vinylidene chloride.

10. An oil-in-water emulsion according to claim 1, further characterized by being free of ammonia and ammonium ions.

11. An oil-in-water emulsion according to claim 1, wherein the organic solvent soluble thermo-setting amino-aldehyde resin comprises additionally a member of the class of organic solvent soluble phenol-formaldehyde resins and ketone-formaldehyde resins.

12. An oil-in-water emulsion according to claim 1, wherein as additional resin binder component ethylcellulose is present in proportions of about 1 to about 10 percent based on the combined non-volatile weight of thermosettable resinous ester (i) and organic solvent-soluble aminoaldehyde resin (iii).

13. An oil-in-water emulsion according to claim 1, in admixture with dispersed pigment which admixture is a textile print paste suitable for application to print textiles and producing textile prints with improved resistance to abrasive laundering, in which there is additionally present a minor quantity of water soluble amino-aldehyde resin in the proportion of from about 0.2 weight parts to about 1 weight part of non-volatile water soluble amino-aldehyde resin for each weight part of pigment present in the print paste.

14. An oil-in-water emulsion in admixture with dispersed pigment which admixture is a textile print paste suitable for application to print textiles and producing textile prints with improved resistance to abrasive laundering, in which emulsion the total non-volatile resin binder content of the oil-phase ranges from about 3.5 weight percent to about 14.5 weight percent based upon the total weight of the emulsion, said emulsion comprising as sole non-volatile resin binder components (i) a thermosettable resinous ester of a polyhydric alcohol, which is at least trihydric, formed with a long chain unsaturated fatty acid, which resinous ester is a member of the group consisting of an ester of the reaction product of p'-p-dihydroxydiphenyldimethylmethane and epichlorhydrin, an oil-modified alkyd and a styrenated oil, (ii) an elastomer and (iii) an organic solvent soluble thermo-setting amino-aldehyde resin selected from the group of melamine-formaldehyde and urea-formaldehyde resins, said amino-aldehyde resin being present in the percentage range of from about 18 weight percent to about 35 weight percent, the resinous ester ranging from about 17 weight percent to about 37 weight percent and the elastomer content ranging from about 37 weight percent to about 57 weight percent based upon the total weight of said non-volatile resin binder components of the emulsion, and said elastomer being an acrylic polymer comprising a polymerized ester of an $\alpha,\beta$-vinylidene monocarboxylic acid formed with an alcohol which is a member of the class consisting of alkyl alcohols, substituted alkyl alcohols, alicyclic alcohols, aromatic alcohols, araliphatic alcohols and heterocyclic alcohols, said monocarboxylic acid being a member of the class represented by the general formula of

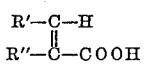

wherein R' is a member of the group consisting of H, $CH_3-$, $C_6H_5-$ and Cl and R'' is a member of the group consisting of H, $CH_3-$, $C_6H_5-$, $C_2H_5-$ and Cl.

15. The process for producing decorated textiles with improved resistance to abrasive laundering wherein in the first step a pigment dispersion which contains dispersed pigment is mixed with a clear resin binder emulsion and a clear extender emulsion to produce a print paste, said paste comprising in the dispersed oil-phase as sole non-volatile resin binder components (i) a thermosettable resinous ester of a polyhydric alcohol which is at least trihydric formed with a long chain of unsaturated fatty acid, which resinous ester is a member of the group consisting of an ester of the reaction product of p'-p-dihydroxydiphenyldimethylmethane and epichlorhydrin, an oil-modified alkyd and a styrenated oil, (ii) an elastomer and (iii) an organic solvent-soluble thermo-setting amino-aldehyde resin selected from the group consisting of melamine-formaldehyde and urea-formaldehyde resins, said amino-aldehyde resin being present in the percentage range of from about 18% to about 35% by weight, the said resinous ester content ranging from about 17 weight percent to about 37 weight percent and the elastomer content ranging from about 37 weight percent to about 57 weight percent, based upon the total weight of said non-volatile resin binder components, said elastomer being an acrylic polymer comprising a polymerized ester of an $\alpha,\beta$-vinylidene monocarboxylic acid formed with an alcohol which is a member of the class consisting of alkyl alcohols, substituted alkyl alcohols, alicyclic alcohols, aromatic alcohols, araliphatic alcohols and heterocyclic alcohols, said monocarboxylic acid being a member of the class represented by the general formula of

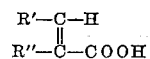

wherein R' is a member of the group consisting of H, $CH_3-$, $C_6H_5-$ and Cl and R'' is a member of the group consisting of H, $CH_3-$, $C_6H_5-$, $C_2H_5-$ and Cl.

16. An oil-in-water emulsion according to claim 1 in which the resinous ester is a styrenated alkyd.

17. A print paste according to claim 14 in which there is additionally present a minor quantity of water soluble amino-aldehyde resin in the proportion of from about 0.2 weight parts to about 1 weight part of non-volatile water soluble amino-aldehyde resin for each weight part of pigment present in the print paste, said water soluble amino-aldehyde resin being a water soluble polymer of a member of the class consisting of a trimethylol melamine and a hexamethylol melamine and their methyl and ethyl ethers.

18. A print paste according to claim 14 comprising an added catalyst for the thermo-setting reaction of the amino-aldehyde resin in the proportion of about 0.1 weight percent to about 2 weight percent, the percents being based on the total weight of the print paste.

19. A print paste according to claim 14 in which the pigment is an organic pigment and in which for each one weight part of pigment the total non-volatile resin binder content of the print paste is at least about two weight parts.

References Cited in the file of this patent

UNITED STATES PATENTS

| | | |
|---|---|---|
| 2,681,322 | Auer | June 15, 1954 |
| 2,865,871 | Johnson et al. | Dec. 23, 1958 |
| 2,900,354 | Auer et al. | Aug. 18, 1959 |